United States Patent [19]

Knudsen et al.

[11] Patent Number: 4,604,900
[45] Date of Patent: Aug. 12, 1986

[54] ADHESIVE JOINT FOR DIAPHRAGM TO SENSOR CONNECTION IN PRESSURE TRANSDUCERS

[75] Inventors: James K. Knudsen, South Euclid; Allen C. Koller, Hamilton; Eugene Skuratovsky, Mayfield Hts.; Gary S. Thomas, Eastlake, all of Ohio

[73] Assignee: The Babcock & Wilcox Company, New Orleans, La.

[21] Appl. No.: 668,460

[22] Filed: Nov. 5, 1984

[51] Int. Cl.$^4$ .............................................. G01L 7/08
[52] U.S. Cl. ...................................... 73/716; 73/706; 92/99
[58] Field of Search ........................ 73/706, 715–729; 92/167, 96, 99

[56] References Cited

U.S. PATENT DOCUMENTS 4,104,924  8/1978  Caspar et al. ........................ 73/716

Primary Examiner—Donald O. Woodiel
Attorney, Agent, or Firm—Vytas R. Matas; Robert J. Edwards

[57] ABSTRACT

A pressure transducer (10) in which a sensor beam (14) is connected to a diaphragm (18) by a shaft assembly (120) which is made up of a sensor post (122) attached to the sensor beam (14), an overpressure stop member (124) attached to the diaphragm (18), and a rigidifying material (126) connecting the sensor beam (14) to the overpressure stop member (24) is disclosed. The overpressure stop member (124) is formed with an extended hollow cylindrical portion (125) that surrounds the sensor post (122), and the rigidifying material (126) fills the space between them.

1 Claim, 3 Drawing Figures

ADHESIVE JOINT FOR DIAPHRAGM TO SENSOR CONNECTION IN PRESSURE TRANSDUCERS

TECHNICAL FIELD

The present invention relates to pressure transducers, and more particularly to an improved joint connecting the diaphragm of a transducer to the sensor thereof.

BACKGROUND ART

In pressure transducers of the type wherein pressure acting on a diaphragm results in a force which is transmitted to a sensor beam, the diaphragm is connected to the sensor beam by a shaft which acts perpendicularly to the diaphragm and to the sensor beam. The diaphragm is protected against damage due to overpressure conditions by means of an O-ring which contacts the transducer body and seals a fluid filled cavity between the diaphragm and the sensor beam, the incompressible fluid preventing excessive movement of the diaphragm under high differential pressure conditions. As the pressure increases, the O-ring continues to compress until a mechanical stop integral with the connecting shaft contacts the transducer body to prevent overstressing the sensor beam.

In the prior art design the connecting shaft must be very accurately located relative to the diaphragm, and the O-ring and mechanical stop must be accurately positioned on the shaft. As a result of the extreme accuracy required, even the slightest misalignment can cause the O-ring to fail to seal properly, which can result in damage to the diaphragm. Under extreme conditions of misalignment the O-ring can become extruded between the mechanical stop and the transducer body resulting in seal failure and thus damage to the diaphragm and/or excessive bending and thus overstress the sensor beam and diaphragm assembly.

Because of the foregoing, it has now become desirable to develop an improved connection between the diaphragm and the sensor beam of a pressure transducer.

SUMMARY OF THE INVENTION

The present invention provides an improved connection between the diaphragm and the sensor in a beam type pressure transducer. Specifically, the shaft connecting the diaphragm and the sensor beam is made up of two parts, an overpressure stop portion connected to the diaphragm and a shaft connected to the sensor beam, with the overpressure stop portion and the shaft being connected together by a rigidifying material connecting the diaphragm and the sensor beam thus eliminating the misalignment and potential tolerance stack-up problems associated with the prior art design.

DESCRIPTION OF THE PREFERRED EMBODIMENT

Figure 1:
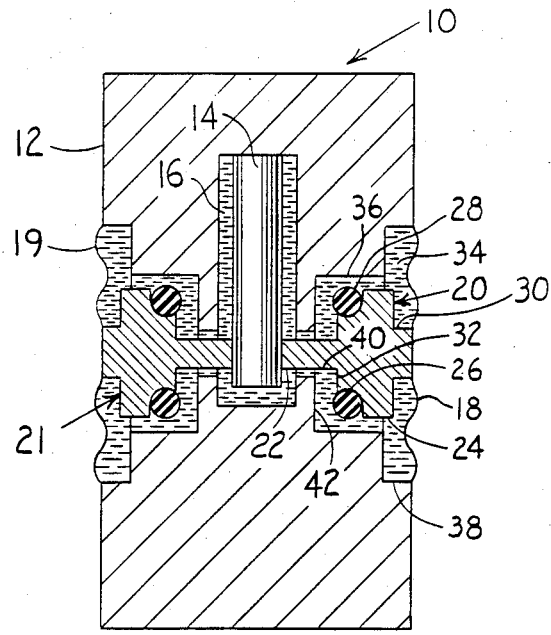
FIG. 1 is a cross-sectional view of a pressure transducer constructed in accordance with the prior art.

Referring now to the drawings, in which like reference characters designate like or corresponding parts throughout the several views, there is shown a pressure transducer 10, comprising a body 12, a sensor beam 14 fixed to the body 12 within a first cavity 16, a first diaphragm 18 attached at its periphery to the body 12, and a first shaft assembly 20 connecting the first diaphragm and the sensor. A second diaphragm 19 is attached to the body 12 opposite the first diaphragm, and a second shaft assembly 21 connects the second diaphragm and the sensor 14. The transducer illustrated herein can be of the type wherein the sensor 14 defines a beam to which strain gauges (not shown) are attached, and wherein bending forces applied to the beam by the diaphragms are proportional to the differential pressure acting on the diaphragms.

Figure 2:
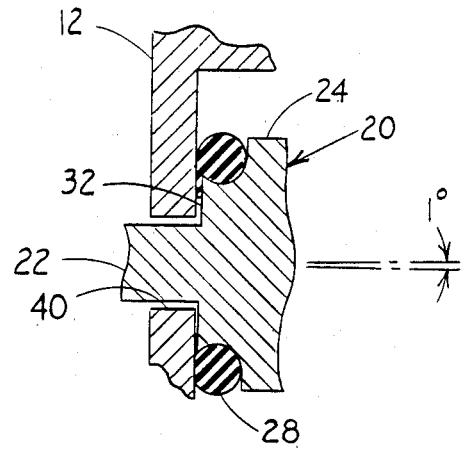
FIG. 2 is an enlarged cross-sectional view showing a portion of the transducer illustrated in FIG. 1.

Referring particularly to FIGS. 1 and 2, the prior art shaft assemblies 20 and 21 are essentially identical, and only one will be described herein in detail. As shown in FIG. 1, the first shaft assembly 20 is a cylindrical member having a first diameter portion 22 which defines an actuating shaft in contact with the sensor beam 14, a second relatively large diameter portion 24 having a channel 26 formed therein to receive an O-ring 28, and a third diameter portion 30 which is attached to the center of the diaphragm 18. The face of the large diameter portion 24 which is defined by its intersection with the first diameter portion 22 defines a mechanical stop surface 32.

The shaft assembly 20 is received within a second cavity 34 defined by first and second counterbores 36 and 38 respectively formed in the side of the body 12, the diaphragm 18 being received over the counterbore 38. The actuating shaft portion 22 extends through a bore 40 formed in the body, which connects the first and second cavities.

The interconnected cavities 16 and 34 are filled with a fluid. If the differential pressure acting on the right side of diaphragm 18 exceeds a predetermined level, the O-ring 28 contacts the wall 42 of the cavity 34 thus sealing the cavity, whereby the incompressibility of the fill fluid will resist further movement of the diaphragm. If further excessive force is applied, the stop surface 32 will contact the wall 42 to prevent further movement and possible damage to the sensor.

In the prior art construction the shaft assembly 20 must be maintained perpendicular to the diaphragm 18, must meet the diaphragm at the proper height, and be concentric with it. Typical tolerances on the position of the shaft are a 0.5° maximum on perpendicularity, ±0.002 inches in height, and 0.005 inches on concentricity. Because there is a large stack-up of dimensions which contribute to the position of the shaft relative to the diaphragm, all dimensions must be held to very close tolerances, which results in high machining and inspection costs. The same is true for the positioning of the O-ring 28 and the mechanical stop 32. Devices of this type have a typical stroke of 0.004 inches with three times permissible overrange (0.012 in.) and very slight O-ring compression (0.003 in. average). For normal operation of the device, the O-ring should not contact the wall within 0.005 inches of motion, and the mechanical stop 32 should contact the wall 42 at a maximum of 0.012 inches of motion. This leaves a ±0.002 inch tolerance on the height position. For a reliable sealing the O-ring should be parallel to its seat within 0.5°.

FIG. 2 illustrates a possible failure mode of the prior art construction. Assuming a 0.180 inch diameter O-ring for illustration, with the O-ring being out of parallel with the seat by 1°, when one side of the O-ring 28 is fully compressed and the stop surface 32 contacts the wall 42, the O-ring will not have sufficient compression to seal, resulting in possible damage to the diaphragm if an overpressure condition occurs. There is further danger of the O-ring being extruded into the gap between the stop surface 32 and the wall 42, resulting in damage to the O-ring as well as damage to the diaphragm and possibly to the sensor beam 14.

Figure 3:
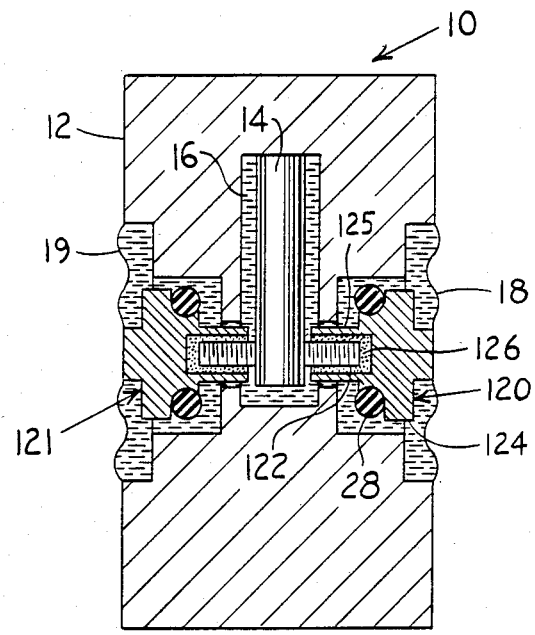
FIG. 3 is a cross-sectional view of a pressure transducer constructed in accordance with the present invention.

Referring to FIG. 3, in accordance with the invention the shaft assemblies 120 and 121 are each formed of two parts, a sensor post 122 which is fixed to the sensor beam 14, and an overpressure stop member 124 which includes an extended hollow cylindrical portion 125. The opening of the extended hollow cylindrical portion 125 and the length of the sensor post 122 are dimensioned such that the extended hollow cylindrical portion 125 surrounds the sensor post 122 with an annular gap therebetween, and there is a space between the end of the sensor post 122 and the bottom of the extended hollow cylindrical portion 125. This space between the sensor post 122 and the cylinder wall of the overpressure stop member 124 is filled with a rigidifying material 126, for example an epoxy.

In the embodiment illustrated, the diaphragms 18 and 19 are attached to the overpressure stop members 124, and the sensor post 122 is attached to the sensor beam 14. When the transducer is assembled, the diaphragms and the overpressure stops are set relative to the transducer body, thus cutting a dimensional stack-up chain down to three links and allowing the adhesive joints to compensate for fairly broad variations in the positions of the sensor posts.

To take full advantage of the shear strength of the adhesive, the interior wall of the extended hollow cylindrical portion 125, and the sensor posts 122 can be threaded, thus increasing the area of adhesion.

Certain modifications and improvements will occur to those skilled in the art upon reading the foregoing description. It will be understood that all such improvements and modifications have been deleted herein for the sake of conciseness and readability, but are properly within the scope of the following claims.

We claim:

1. In a pressure transducer having a body, a sensor beam fixed to the body within a first cavity formed therein, a diaphragm attached to a side of said body over a second cavity in communication with said first cavity, and a shaft assembly connecting said diaphragm and the sensor beam, the improvement wherein said shaft assembly comprises:
   a sensor post attached to said sensor beam and having a free end;
   an overpressure stop member having an extended hollow cylindrical portion spaced away from and in surrounding relation to said sensor post and attached to said diaphragm; and
   epoxy rigidifying material that is received in the space between said sensor post and said extended hollow cylindrical portion of said overpressure stop member for connecting said sensor post and said overpressure stop member.

* * * * *